United States Patent [19]

Wojdyla

[11] Patent Number: 5,138,991

[45] Date of Patent: Aug. 18, 1992

[54] CRANKSHAFT FOR INTERNAL COMBUSTION ENGINE

[75] Inventor: John R. Wojdyla, Allen Park, Mich.

[73] Assignee: Ford Motor Company, Dearborn, Mich.

[21] Appl. No.: 812,315

[22] Filed: Dec. 23, 1991

[51] Int. Cl.⁵ .............................................. F01M 1/06
[52] U.S. Cl. ................................ 123/196 R; 184/6.5
[58] Field of Search .................. 123/196 W, 196 R; 29/888.8; 184/6.5

[56] References Cited

U.S. PATENT DOCUMENTS

| | | | |
|---|---|---|---|
| 1,872,365 | 8/1932 | Underwood | 184/6.5 |
| 2,554,154 | 5/1951 | Postma | 184/6.5 |
| 2,723,003 | 11/1955 | Antonsen | 184/6.5 |
| 2,907,411 | 10/1959 | Leach | 184/6.5 |
| 3,785,459 | 1/1974 | Patchen | 184/6.5 |
| 4,345,797 | 8/1982 | Ballheimer | 123/196 R |
| 4,589,382 | 5/1986 | Tsuboi | 123/196 R |
| 4,622,933 | 11/1986 | Fukuo et al. | 123/196 R |
| 4,785,790 | 11/1988 | Pfeffer et al. | 123/196 R |
| 4,793,301 | 12/1988 | Ishikawa | 123/196 R |
| 4,969,430 | 11/1990 | Masuda | 123/196 R |

Primary Examiner—E. Rollins Cross
Assistant Examiner—Erick Solis
Attorney, Agent, or Firm—Jerome R. Drouillard; Roger L. May

[57] ABSTRACT

A crankshaft for an internal combustion engine includes main bearing journals and connecting rod journals, with the connecting rod journals being disposed between successive main bearing journals. A transverse oil passage extends linearly into each connecting rod journal from an adjoining main bearing journal, with each oil passage running from the surface of a main bearing journal to an oil reservoir formed in the connecting rod journal.

3 Claims, 3 Drawing Sheets

CRANKSHAFT FOR INTERNAL COMBUSTION ENGINE

BACKGROUND OF THE INVENTION

This invention relates to an internal combustion engine crankshaft having an oiling arrangement permitting increased engine fuel efficiency.

DISCLOSURE INFORMATION

Internal combustion engine crankshafts are typically lubricated by oil supplied to the main bearing journals by means of passages located within the cylinder block. Lubrication is provided to the connecting rod journals via passages formed within the crankshaft. The passages lead from the main bearing journals to the connecting rod journals. Such passages commonly include a cross-drilled passageway formed in the main bearing journal so that the oil feed system for the connecting rod will pick up oil during a full 360° of rotation of the crankshaft, with the oil being supplied from a 180° groove formed in the main bearing insert. Examples of cross-drilled main bearing journals are shown in U.S. Pat. Nos. 4,345,797 to Ballheimer; 4,622,933 to Fukuo et al.; and 4,793,301 to Ishikawa. U.S. Pat. No. 4,589,382 to Tsuboi shows a similar arrangement for achieving a full 360° of oil pickup capability in which separate inclined drillings are extended from diametrically opposed surfaces of the crankshaft. Although the U.S. Pat. No. '382 patent shows a reservoir formed in the rod journal of the crankshaft, the reservoir is fed by a passage which appears to extend through the axial centerline of the crankshaft.

Each of the arrangements shown in the U.S. Pat. Nos. '797, '933, '301, and '382 patents suffers from the disadvantage that increased oil pressure is required to achieve the lubrication demanded by the engine because there must be adequate main gallery oil pressure to overcome the centrifugal force effects caused by the rotating crankshaft. In order to reach the connecting rod journals during an entire 360° rotation period, oil must travel from the surface of the main bearing journals inwardly through the center of the crankshaft for 180° of rotation, while simultaneously flowing against the greatest opposing centrifugal force which urges the oil radially outward. A sufficient flow of oil is needed at the connecting rod journals to keep the bearings cool and to provide a hydrodynamic film. In order to maintain sufficient oil pressure to overcome the centrifugal force acting against the oil with conventionally cross-drilled main bearing journals, while supplying a sufficient amount of oil to perform the necessary lubricating function, engine oil pressure must be maintained at 50-70 p.s.i. in the main galleries in order to safely overcome centrifugally induced backpressure of 25-35 p.s.i. at high engine speeds. A crankshaft according to the present invention will allow a lowering of this pressure, because oil need not pass through the center of the crankshaft at any time during the 360° rotation period.

U.S. Pat. No. 4,785,790 to Pfeffer et al. discloses an arrangement for the control of oil fed into a control chamber of a piston, which includes a radially drilled oil passage in a connecting rod journal cooperating with a reservoir formed between the surface of the journal and the surface of the mating bearing. With such a construction, control of the oil pressure is crucial to avoid undesirable connecting rod knock.

U.S. Pat. No. 4,969,430 to Masuda discloses a lubrication system for a two-stroke cycle engine in which oil leaking from a roller bearing equipped main bearing flows through a channel drilled generally laterally through the connecting rod journal Because the system shown in the '430 patent is not a pressure feed lubrication system, but rather one which relies upon leakage past the bearing, such a system is not believed to be suitable for high load operation in automotive internal combustion engines.

It is an object of the present invention to provide an internal combustion engine crankshaft and main bearing system which will allow operation of the engine's oil supply at a reduced supply pressure, thereby conserving fuel, while maintaining lubricant flow through the connecting rod bearings at rates which are similar to conventional, non pressure-reduced systems.

It is yet another object of the present invention to provide an internal combustion engine crankshaft which may be more easily machined than known crankshafts.

It is another advantage of the present system that the connecting rod journal reservoirs associated with this system may be employed as a device for altering the mass of the journals, so as to facilitate dynamic balancing of a crankshaft incorporating the present invention.

Other objects, features and advantages of the present invention will become apparent to the reader of this specification.

SUMMARY OF THE INVENTION

A crankshaft for an internal combustion engine comprises at least one main bearing journal, at least one connecting rod journal adjoining the main bearing journal, and a transverse oil passage extending linearly from the surface of the main bearing journal into the connecting rod journal, without passing through the axial centerline of the crankshaft. An oil reservoir formed within the connecting rod journal in fluid communication with the transverse passage extending into the journal supplies oil to connecting rods mounted to the connecting rod journal. The reservoir may comprise a bore extending through a portion of the connecting rod journal underlying the bearing surface of the journal, with the longitudinal axis of the bore parallel to the axial centerline of the crankshaft, and with the bore having one or more ports extending to the surface of the connecting rod journal. Alternatively, the reservoir may comprise a bore extending through the surface of the connecting rod journal itself.

According to another aspect of the present invention, a crankshaft including a plurality of axially separated main bearing journals and a plurality of axially separated connecting rod journals, with each connecting rod journal adapted to receive two connecting rods, and with each of the connecting rod journals being disposed between successive main bearing journals, has a plurality of transverse oil passages extending linearly into each connecting rod journal from the adjoining main bearing journals, with each oil passage running from the surface of a main bearing journal into one of the connecting rod journals, without passing through the axial centerline of the crankshaft. Each transverse oil passage is associated with a separate oil reservoir formed within a connecting rod journal and extending through the surface of the connecting rod journal.

DETAILED DESCRIPTION OF THE PREFERRED EMBODIMENTS

Figure 1:
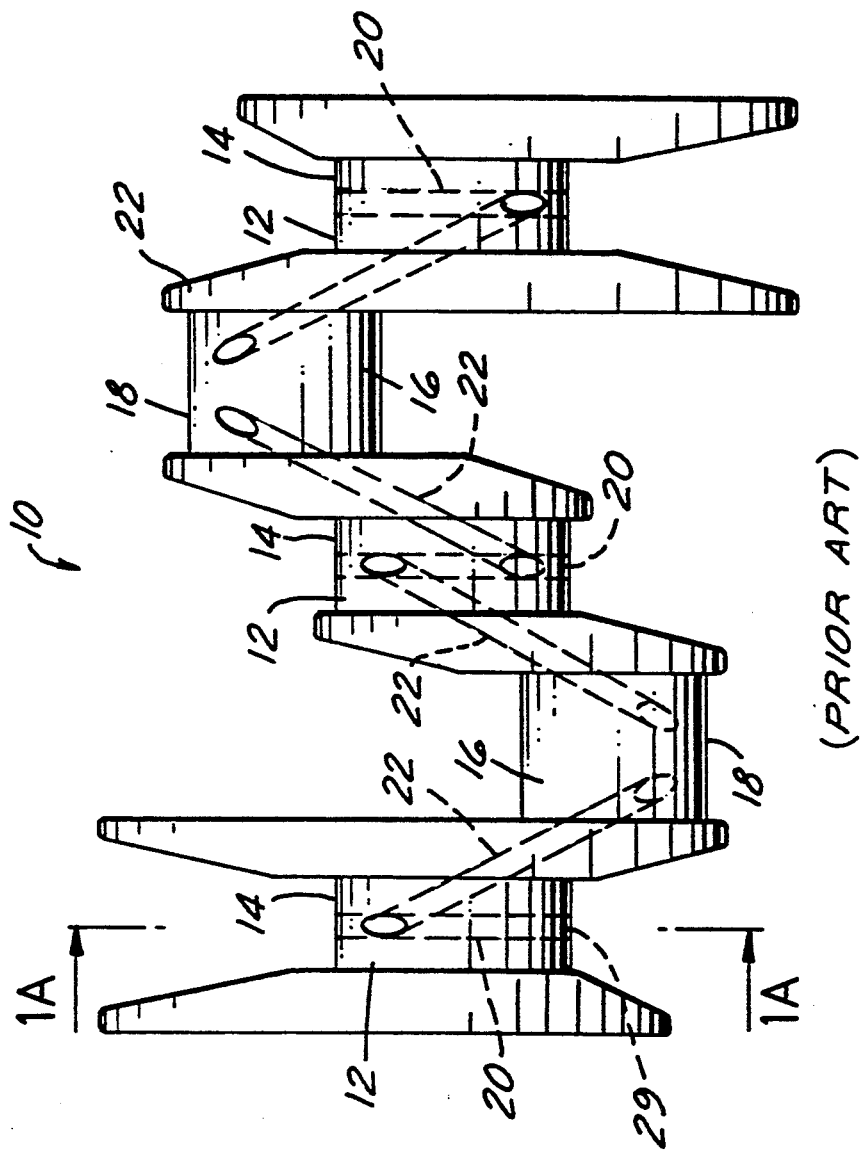
FIG. 1 illustrates a prior art crankshaft having conventional cross-drilled main bearings.
Figure 1A:
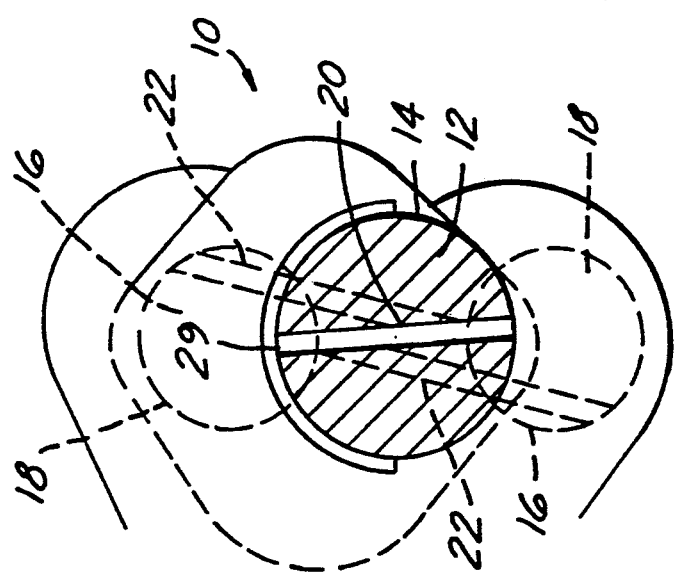
FIG. 1A illustrates a sectional view of the crankshaft of FIG. 1 taken along the line 1A—1A of FIG. 1.

As shown in each of the figures, a crankshaft, 10, has a plurality of main bearing journals, 12, having bearing surfaces 14. Connecting rod journals, 16, having bearing surfaces, 18, adjoin main bearing journals 12. Accordingly, it is noted that each of the crankshafts illustrated has a plurality of axially separated main bearing journals, 12, and a plurality of axially separated connecting rod journals 16, with each of the connecting rod journals 16 being disposed between successive main bearing journals 12. Referring now to FIGS. 1 and 1A, oil enters main bearing journals 12 of crankshaft 10 by means of cross-drillings 20. Each cross-drilling erupts from its associated main bearing journal so as to form two oil induction ports, 29, disposed 180° from each other about the circumference of main bearing journal surface 14. As shown in FIGS. 1A, 2A and 3A, an oil supply groove, 24, located in the main bearing insert (not shown) supplies oil to induction ports 29 on the main bearing journals whenever at least one port is in registry with main bearing oil feed groove 24. As shown in FIG. 1A, a deficiency associated with feeding oil to connecting rod journals from a cross-drilled main journal lies in the fact that the upper journal 16 illustrated in FIG. 1A will receive oil via connecting rod journal feed passage 22 only after the oil passes through the center of the crankshaft. Accordingly, the engine oil pump pressure must be set high enough to accommodate this need.

Figure 2:
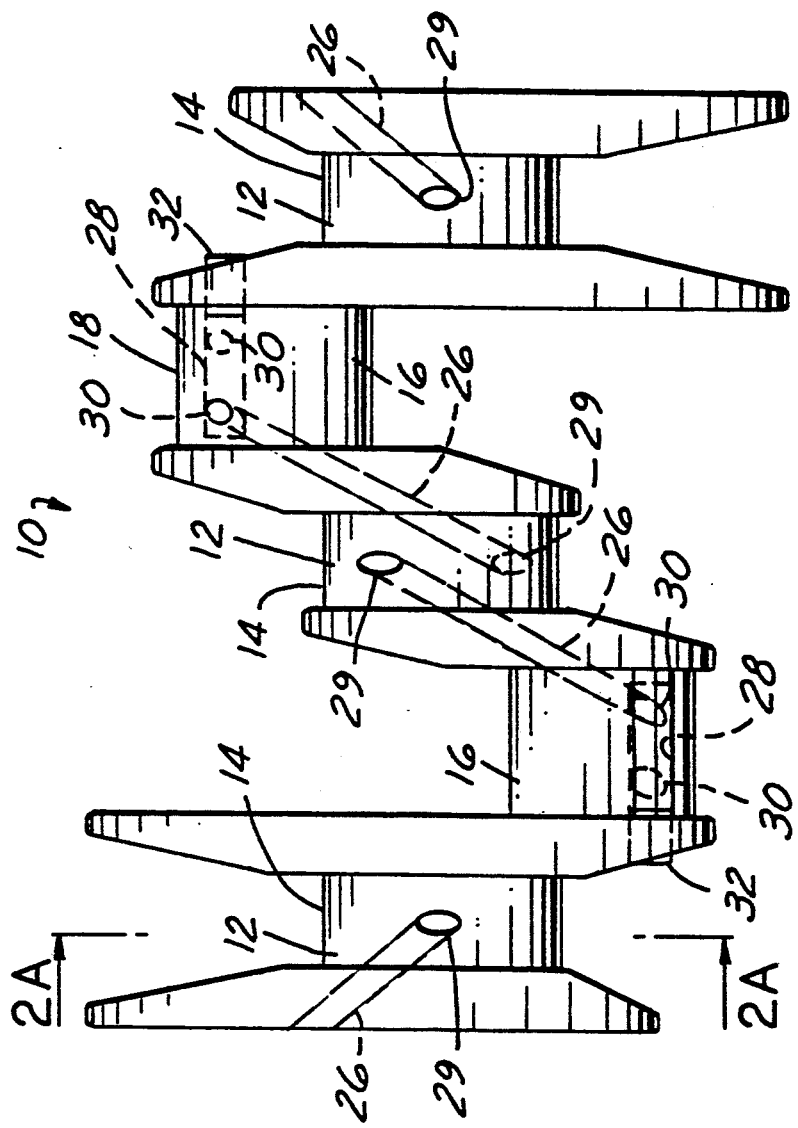
FIG. 2 illustrates a crankshaft constructed according to one aspect of the present invention and including linear transverse oil feed passages extending from the surface of each main bearing journal to the connecting rod journals.
Figure 2A:
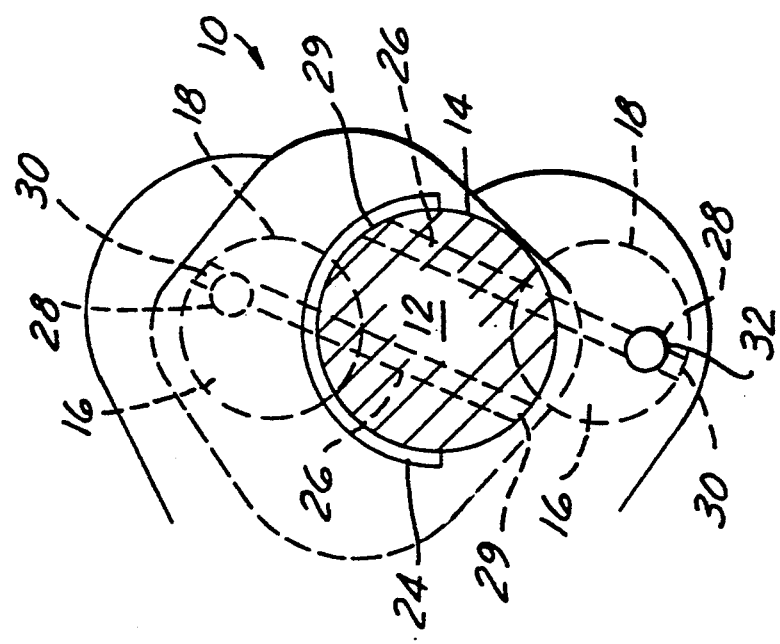
FIG. 2A is a sectional view of the crankshaft of FIG. 2, taken along the line 2A—2A of FIG. 2

According to a first embodiment of the present invention shown in FIG. 2, a series of transverse oil passages, 26, extend linearly from the surface, 14, of each main bearing journal 12 to an axial reservoir 28 formed under the surface 18 of each connecting rod journal 16. Oil is picked up from the main bearing cavity by means of induction ports 29 and then progresses along each transverse oil passage 26 until entering axial reservoir 28, which is defined by an axially extending boring through at least a portion of each connecting rod journal 16, with one end of the boring being closed by a plug 32 inserted therein. Oil fed to axial reservoirs 28 is discharged from a plurality of ports 30 which extend to the connecting rod journal surface 18. It should be noted from FIG. 2A that transverse oil passages 26 do not pass through the centerline of crankshaft 10. As a result, oil moving through passages 26 is not subjected to the same degree of centrifugal force as is oil moving to the connecting rod journals of the crankshaft shown in FIGS. 1 and 1A. Oil passing through transverse oil Passage 26 will accumulate in reservoir 28 so as to allow adequate lubrication to reach the connecting rod large end bearing notwithstanding that transverse oil passage 26 will pick up oil from main bearing feed arc 24 only during 180° of rotation of crankshaft 10. It is believed that full advantage may be taken of the crankshaft configuration illustrated in FIG. 2 if the usual connecting rod large end bearing eccentricity is enlarged to further reduce the restriction upon oil flowing through the crankshaft. If the eccentricity measurement, that is, the difference in the inside diameter of the assembled connecting rod and its bearing inserts between a first measurement determined along the centerline of the connecting rod I-beam and a second measurement determined along the connecting rod large end parting line, is about 0.001 inches, this could be increased to 0.002 or 0.003 inches.

Figure 3:
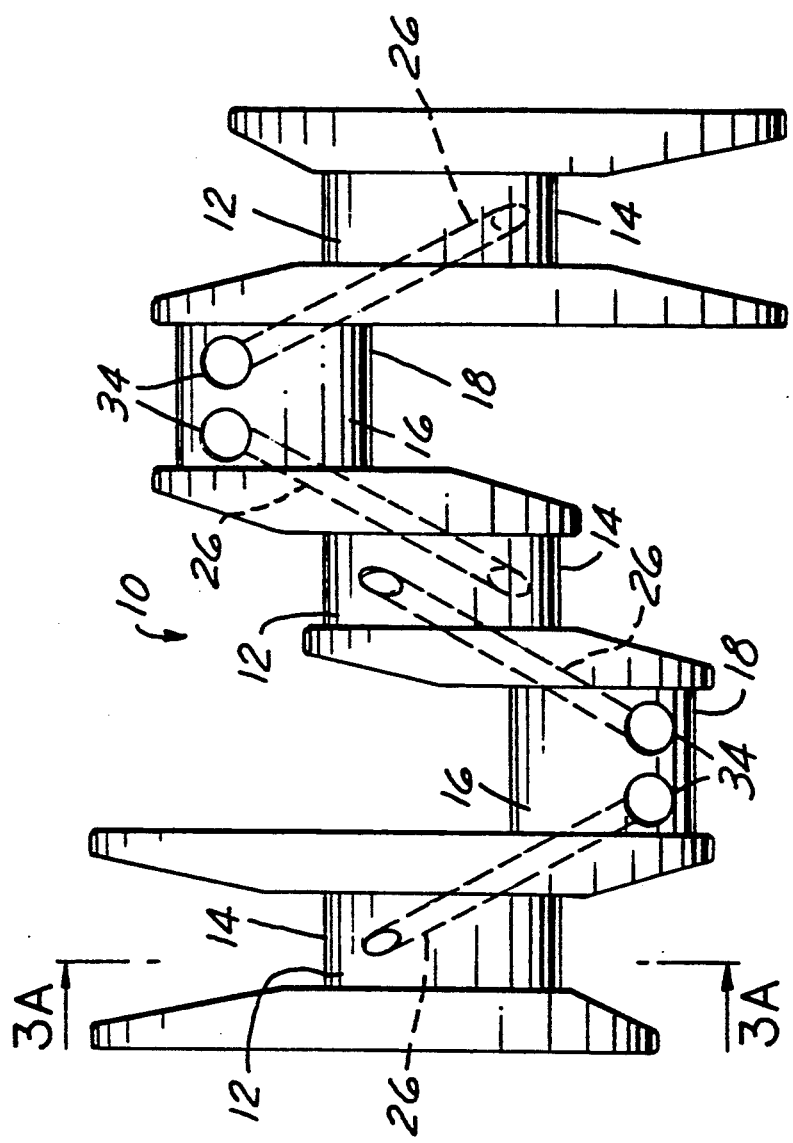
FIG. 3 is a second example of a crankshaft constructed according to the present invention including linear transverse oil feed passages and direct opening reservoirs formed in the connecting rod journals.
Figure 3A:
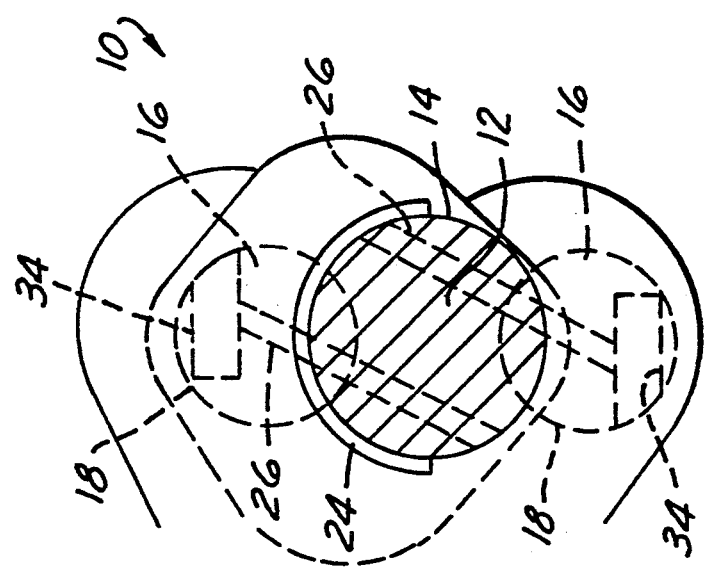
FIG. 3A is a sectional view of the crankshaft of FIG. 3, taken along the line 3A—3A of FIG. 3.

FIGS. 3 and 3A illustrate a second embodiment according to the present invention in which transverse oil passages 26 terminate in a series of direct opening reservoirs, 34. As best seen in FIG. 3A, each direct opening reservoir is bored into or formed into a connecting rod journal 16 so that oil passing through transverse oil passage 26 will accumulate in reservoir 34 so as to allow adequate lubrication to reach the connecting rod large end bearing notwithstanding that transverse oil passage 26 will pick up oil from main bearing oil feed arc 24 only during 180° of rotation of crankshaft 10. Note in FIG. 3 that each connecting rod journal 16 has two direct opening reservoirs 34 extending through surface 18 of the connecting rod journal 16. In this manner, an in-line engine having a single connecting rod mounted upon each connecting rod journal 16 could be lubricated by both reservoirs. Alternatively, with a vee type engine, two connecting rods could be lubricated, each by oil flowing through a single direct opening reservoir 34. Because the second embodiment illustrated in FIGS. 3 and 3A does not require a plug such as that shown as item 32 in FIG. 2, the second embodiment will require fewer machining operations and fewer components.

While the invention has been shown and described in its preferred embodiments, it will be clear to those skilled in the art that many changes and modifications may be made thereto without departing from the scope of the invention.

I claim:

1. A crankshaft for an internal combustion engine comprising:
   at least one main bearing journal;
   at least one connecting rod journal adjoining said main bearing journal;
   a transverse oil passage extending linearly from the surface of the main bearing journal into the connecting rod journal, without passing through the axial centerline of the crankshaft; and
   an oil reservoir formed within the connecting rod journal such that said transverse passage is in fluid communication with aid reservoir, with said reservoir comprising a bore extending through a portion of said connecting rod journal underlying the bearing surface of the journal, with the longitudinal axis of the bore parallel to the axial centerline of the crankshaft, and with said bore having one or more ports extending to the surface of each connecting rod journal.

2. A crankshaft according to claim 1, wherein said reservoir is adapted to supply oil to two connecting rods.

3. A crankshaft for an internal combustion engine comprising:
   at least one main bearing journal;
   at least one connecting rod journal adjoining said main bearing journal;
   a transverse oil passage extending linearly from the surface of the main bearing journal into the connecting rod journal, without passing through the axial centerline of the crankshaft; and
   an oil reservoir formed within the connecting rod journal such that said transverse passage is in fluid communication with said reservoir, with said reservoir comprising a bore having a diameter which is larger than the diameter of said transverse passage, with said bore extending through the surface of the connecting rod journal and being in fluid communication with said passageway.

* * * * *